(12) United States Patent
Enomoto et al.

(10) Patent No.: US 8,936,739 B2
(45) Date of Patent: Jan. 20, 2015

(54) RECIPROCATING APPARATUS, METHOD OF CONTROLLING RECIPROCATING APPARATUS, AND INJECTION MOLDING APPARATUS

(75) Inventors: Jun Enomoto, Numazu (JP); Harunobu Inami, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 927 days.

(21) Appl. No.: 13/045,318

(22) Filed: Mar. 10, 2011

(65) Prior Publication Data
US 2011/0223274 A1    Sep. 15, 2011

(30) Foreign Application Priority Data
Mar. 12, 2010    (JP) .................................. 2010-056448

(51) Int. Cl.
*B29C 45/40*    (2006.01)
*B29C 45/76*    (2006.01)
(52) U.S. Cl.
CPC ... *B29C 45/7626* (2013.01); *B29C 2945/76113* (2013.01); *B29C 2945/76247* (2013.01); *B29C 2945/76418* (2013.01);
(Continued)
(58) Field of Classification Search
USPC ......... 425/139, 165, 444, 556; 264/40.1, 334; 700/200, 204
See application file for complete search history.

(56) References Cited

U.S. PATENT DOCUMENTS 5,639,486 A * 6/1997 Yamaguchi ................... 425/139
5,736,079 A * 4/1998 Kamiguchi et al. .......... 425/139
(Continued)

FOREIGN PATENT DOCUMENTS

CN          101347846      1/2009
DE         602005001454    2/2008
(Continued)

OTHER PUBLICATIONS

Japanese Office Action issued in JP 2010-056448 on Aug. 6, 2013.
(Continued)

*Primary Examiner* — James Mackey
(74) *Attorney, Agent, or Firm* — DLA Piper LLP (US)

(57) ABSTRACT

A reciprocating apparatus comprises a reciprocating member, a drive mechanism, an input device, a work-switch position calculating unit configured to calculate a work-switch position for the drive mechanism, a direction-switch position calculating unit configured to calculate a direction-switch position, a remaining-distance calculating unit configured to calculate a remaining distance that is a difference between the direction-switch position calculated by the direction-switch position calculating unit and a direction-switch position input at the input device, a target direction-switch position calculating unit configured to add the remaining distance, to the direction-switch position calculated by the direction-switch position calculating unit, thereby to calculate a target direction-switch position, and a corrected position calculating unit configured to calculates a corrected work-switch position for the drive mechanism so that the drive mechanism may cause the reciprocating member to start moving in the opposite direction at the target direction-switch position calculated by the target direction-switch position calculating unit.

6 Claims, 6 Drawing Sheets

(52) U.S. Cl.
CPC ............... *B29C 2945/76568* (2013.01); *B29C 2945/76602* (2013.01); *B29C 2945/76896* (2013.01)
USPC .......... 264/40.1; 264/334; 425/139; 425/165; 425/556; 700/200

(56) References Cited

U.S. PATENT DOCUMENTS

| | | | |
|---|---|---|---|
| 6,430,466 B1 | 8/2002 | Reddy | |
| 7,252,796 B2* | 8/2007 | Nishizawa | 425/139 |
| 7,275,922 B2* | 10/2007 | Uchiyama et al. | 425/139 |
| 7,708,540 B2* | 5/2010 | Watanabe et al. | 425/139 |
| 2004/0012108 A1* | 1/2004 | Yoshioka | 425/139 |

FOREIGN PATENT DOCUMENTS

| | | |
|---|---|---|
| DE | 102011013380 | 12/2011 |
| JP | 10-225965 | 8/1998 |
| JP | 10-286857 | 10/1998 |
| JP | 11-227011 | 8/1999 |
| JP | 2008-194830 | 8/2008 |

OTHER PUBLICATIONS

English Language Translation of Japanese Office Action issued in JP 2010-056448 on Aug. 6, 2013.
English Language Abstract and Translation of JP 11-227011 published on Aug. 24, 1999.
English Language Abstract and Translation of JP 10-225965 published on Aug. 25, 1998.
Chinese Office Action issued in CN 2013050600596830 on May 9, 2013.
English Language Translation of Chinese Office Action issued in CN 2013050600596830 on May 9, 2013.
English Language Abstract of JP 2008-194830 published Aug. 28, 2008.
English Language Translation of JP 2008-194830 published Aug. 28, 2008.
English Language Abstract of CN 101347846 published Jan. 21, 2009.
English Language Abstract of JP 10-286857 published Oct. 27, 1998.
English Language Translation of JP 10-286857 published Oct. 27, 1998.
German Office Action issued in DE 10 2011 013 518.9 on Jan. 21, 2014.
English Language Translation of German Office Action issued in DE 10 2011 013 518.9 on Jan. 21, 2014.
English Language Abstract and Translation of DE 10 2011 013 380 published on Dec. 15, 2011.
English Language Abstract of DE 60 2005 001 454 published on Feb. 28, 2008.

* cited by examiner

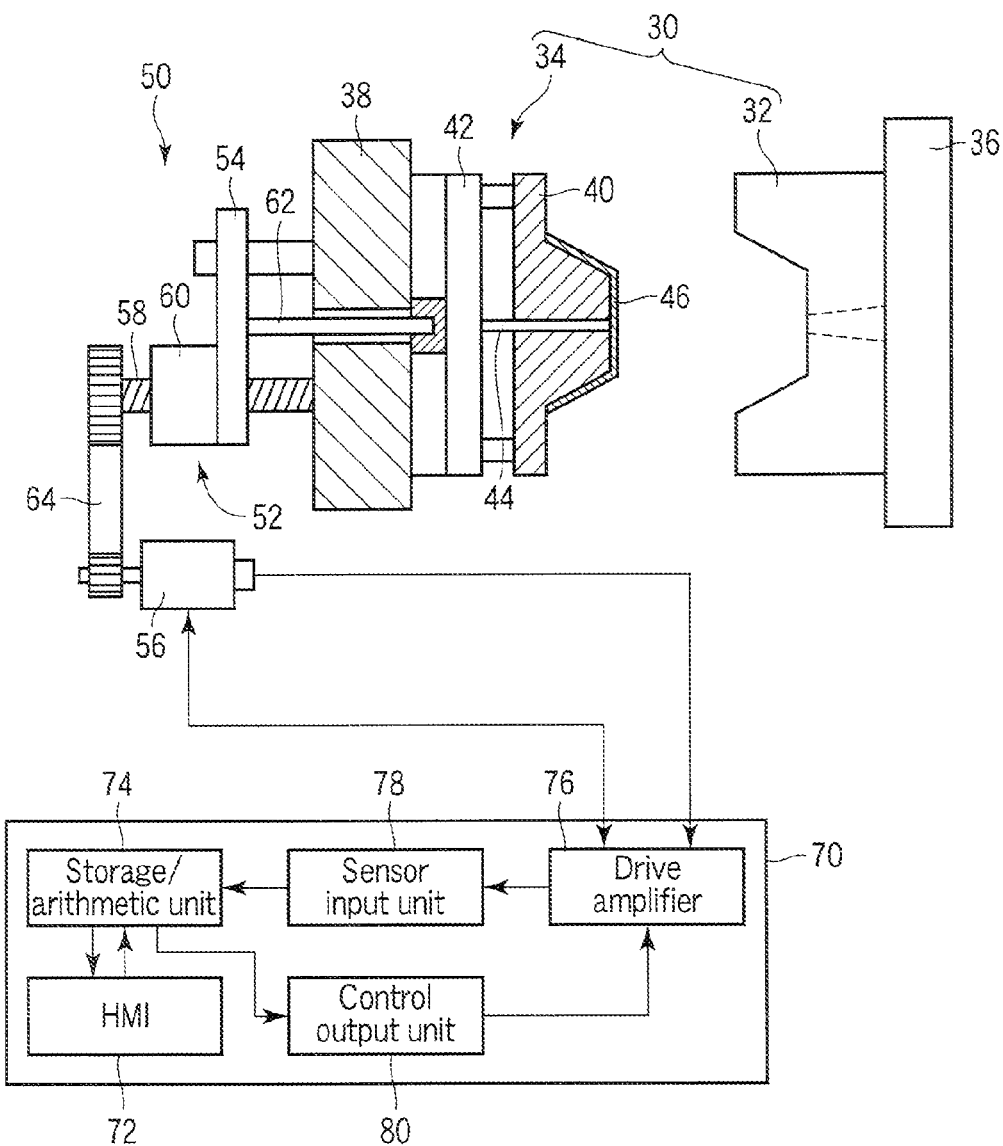
F I G. 1

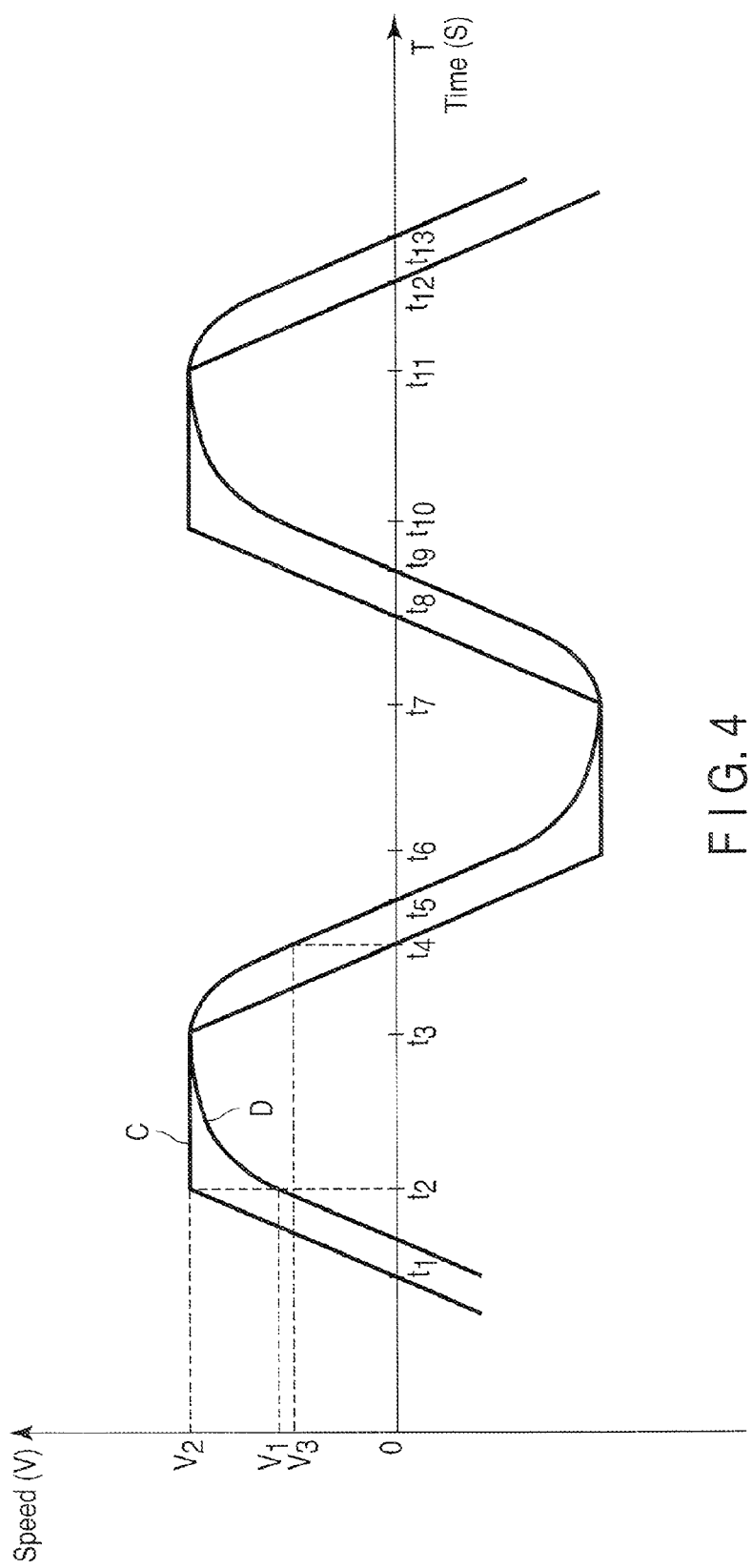
F I G. 4

RECIPROCATING APPARATUS, METHOD OF CONTROLLING RECIPROCATING APPARATUS, AND INJECTION MOLDING APPARATUS

CROSS-REFERENCE TO RELATED APPLICATIONS

This application is based upon and claims the benefit of priority from prior Japanese Patent Application No. 2010-056448, filed Mar. 12, 2010, the entire contents of which are incorporated herein by reference.

BACKGROUND OF THE INVENTION

1. Field of the Invention

The present invention relates to a reciprocating apparatus, a method of controlling a reciprocating apparatus, and an injection molding apparatus, each able to thrust, for example, the push-pin provided in a mold, precisely to the preset position and to reciprocate the push-pin at high speed a prescribed number of times.

2. Description of the Related Art

An injection molding apparatus comprises an injection device and a mold fastening device. The injection device has a cylinder and a screw provided in the cylinder. The mold fastening device is designed to open and close a mold. In the cylinder of the injection device, the screw is rotated and moved back and forth, injecting molten resin into the mold in order to form a product.

The mold fastening device comprises a mold fastening mechanism and a pushing mechanism. The mold fastening mechanism can first open and close a mold and then fasten the mold, in order to form a product. The pushing mechanism is configured to push the product out of the mold. The pushing mechanism has, in most cases, a drive mechanism and a push-plate. The drive mechanism can reciprocate the push-plate. The push-plate can abut on a push-pin provided in the mold. Hence, the pushing mechanism can be coupled to the push-pin.

After the mold fastening device has opened the mold, the pushing mechanism is driven. As a result, the push-plate pushes the push-pin from the mold. The product is thereby pushed out of the mold and made to fall into, for example, a product collecting box. As is known in the art, most pushing mechanisms developed in recent years have an electric motor, particularly a servomotor, which drives the push-plate.

It is desired that the time for molding the product should be shortened in the injection molding. In view of this, a technique of moving the push-pin (pushing member) at high speed has been developed (see, for example, Jpn. Pat. Appln. KOKAI Publication No. 10-286857). This technique is a method of controlling the ejector of the injection molding apparatus. In this method, the position of the push-pin is accurately controlled only in the step of moving back the push-pin. In any other step, the push-pin is never stopped at the foremost position and the pushing member is moved faster than in the step of moving back the push-pin. Since the push-pin is not accurately positioned, except in the step of moving back the push-pin, the push-pin can be moved at a higher speed than before.

The injection molding apparatus forms not only products that can be made even if the push-pin is not accurately positioned, but also products that cannot be made without accurately positioning the push-pin. The technique described above (i.e., moving the pushing member at high speed) can indeed be used even if the push-pin is pushed to various positions to make products, but cannot be used if the push-pin should be pushed to the precise position preset to make products.

Further, it is demanded that the push-pin should be reciprocated at high speed and be precisely controlled in position, to mold a product, thereby to shorten the time for molding the product.

BRIEF SUMMARY OF THE INVENTION

An object of this invention is to provide an reciprocating apparatus, a method of controlling a reciprocating apparatus and an injection molding apparatus, each able to cause a reciprocating member, such as the push-pin of a mold to start moving in the opposite direction, always at an accurate position.

To achieve the object mentioned above, an invention according to this invention comprises: a reciprocating member configured to reciprocate freely; a drive mechanism configured to move the reciprocating member back and forth; an input device configured to input conditions in which to reciprocate the reciprocating member; a work-switch position calculating unit configured to calculate a work-switch position for the drive mechanism, from speed data input at the input device, so that the direction-switch position of the reciprocating member may approach a value input at the input device; a direction-switch position calculating unit configured to calculate a direction-switch position at which the reciprocating member must start moving in the opposite direction when the working of the drive mechanism is switched at the work-switch position calculated by the work-switch position calculating unit; a remaining-distance calculating unit configured to calculate a remaining distance that is a difference between the direction-switch position calculated for the reciprocating member by the direction-switch position calculating unit and a direction-switch position input at the input device; a target direction-switch position calculating unit configured to add the remaining distance calculated by the remaining-distance calculating unit, to the direction-switch position calculated by the direction-switch position calculating unit, thereby to calculate a target direction-switch position; and a corrected position calculating unit configured to calculates a corrected work-switch position for the drive mechanism so that the drive mechanism may cause the reciprocating member to start moving in the opposite direction at the target direction-switch position calculated by the target direction-switch position calculating unit.

According to this invention, the foremost position the reciprocating member can have, the number of times the reciprocating member must be reciprocated, and the speed pattern for the reciprocating member are input, the work-switch position for a servomotor is corrected in accordance with these values input, and the reciprocating member is reciprocated in accordance with the work-switch position so corrected.

BRIEF DESCRIPTION OF THE SEVERAL VIEWS OF THE DRAWING

FIG. 1 is a sectional view showing an embodiment of a mold fastening device for use in an injection molding apparatus that has a reciprocating apparatus according to this invention;

FIG. 4 is a diagram showing how the speed changes, with which the push-pin is moved in the mold fastening device;

DETAILED DESCRIPTION OF THE INVENTION

Embodiments of this invention will be described in detail, with reference to the accompanying drawings.

Figure 8:
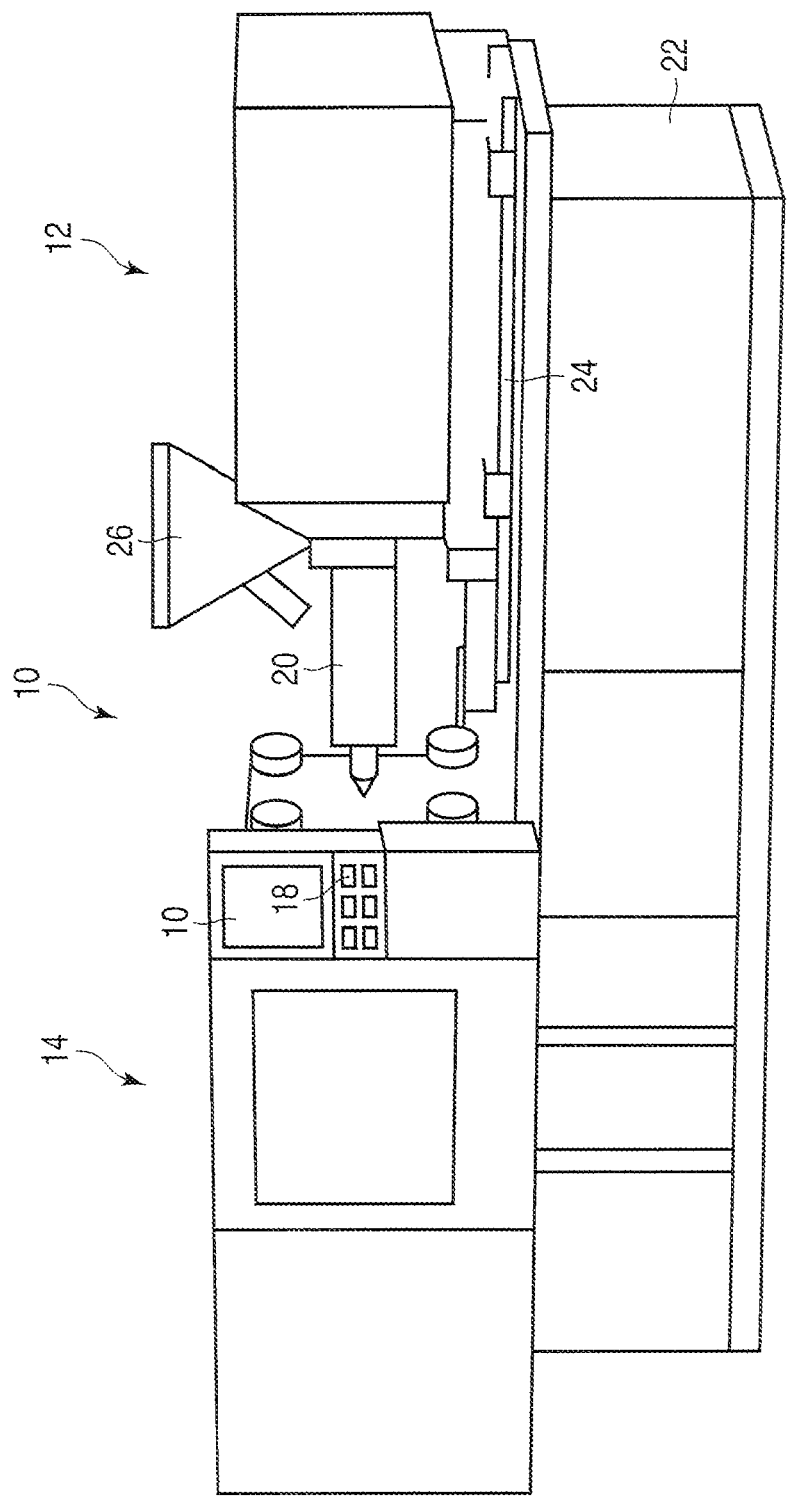
FIG. 8 is a perspective view of an injection molding apparatus incorporating the mold fastening device of FIG. 7.

An embodiment of a reciprocating apparatus according to this invention will be described, which is designed for use in molding apparatuses. FIG. 8 shows an injection molding apparatus 10.

The injection molding apparatus 10 comprises a base 22, an injection device 12, and a mold fastening device 14. A display means 16 and an input means 18 are provided on the center part of the injection molding apparatus 10.

The base 22 is shaped like a rectangular parallelepiped. On the upper surface of the base 22, a first rail 24 is laid. The first rail 24 extends longitudinally relative to the base 22. On the first rail 24, the injection device 12 is mounted on the first rail 24, and can move longitudinally relative to the base 22. On the left-side part of the base 22, the mold fastening device 14 is mounted, opposed to the injection device 12.

The injection device 12 comprises a cylinder 20, a drive mechanism, and a hopper 26. The cylinder 20 incorporates a screw. The drive mechanism is configured to rotate the screw around its axis and to move the same back and forth, along its axis.

In the cylinder 20 of the injection device 12, resin is melted. The drive mechanism melts resin in the cylinder 20. The drive mechanism moves the screw forwards. The molten resin is thereby injected from the cylinder 20 into the cavity of a mold 30 (shown in FIG. 1). The injection device 12 and the mold fastening device 14 have a cover each. FIG. 8 illustrates the injection device 12 and the mold fastening device 14, both in a covered state.

The mold fastening device 14 comprises a mold fastening mechanism. The mold fastening mechanism holds the mold 30 (shown in FIG. 1). The mold fastening device 14 can open and close the mold 30. The mold fastening device 14 is of a type hitherto known, in both mechanism and configuration. The mold fastening device 14 has a pressure sensor and a position sensor. These sensors can detect the pressure in the mold 30 and the opening thereof, at the time of opening and closing the mold 30. Preferably, the mold fastening device 14 should be driven by a servomotor. Alternatively, it may be hydraulically driven.

As shown in FIG. 1, the mold 30 is composed of a stationary mold 32 and a movable mold 34. The stationary mold 32 is secured to the stationary die plate 36 of the mold fastening mechanism. The movable mold 34 is secured to the movable die plate 38 of the mold fastening mechanism.

The movable mold 34 comprises a movable-mold main part 40 and a push-plate 42. The movable-mold main part 40 is shaped, defining the shape of the product to be formed. The push-plate 42 can move to the left and the right (in FIG. 1) with respect to the movable-mold main part 40. The push-plate 42 has a push-pin 44, which functions as a reciprocating member. The push-pin 44 can slide through a hole made in the movable-mold main part 40, to move back and forth as the push-plate 42 is moved. In FIG. 1, reference number 46 designates a product formed by using the mold 30.

The mold fastening device 14 further has a pushing mechanism 50. The pushing mechanism 50 comprises a feed screw mechanism 52, a push-plate 54, and a servomotor 56 for driving the feed screw mechanism 52. The feed screw mechanism 52 is composed of a feed screw 58 and a working part 60 set in screw engagement with the feed screw 58. The working part 60 is moved back and forth (to the left and the right in FIG. 1) when the feed screw 58 rotates. The push-plate 54 is secured to the working part 60.

The push-plate 54 has a working rod 62. The working rod 62 can slide freely in the hole made in the movable die plate 38. The working rod 62 is coupled at distal end to the push-plate 42. The servomotor 56 is connected to a control device 70 and has a shaft that is coupled by a timing belt to the feed screw 58 of the feed screw mechanism 52.

The control device 70 will be described. As shown in the lower half of FIG. 1, the control device 70 comprises a human interface (HMI) 72, a storage/arithmetic unit 74, a drive amplifier 76, a sensor input unit 78, and a control output unit 80.

The HMI 72 is connected to an external input device such as a keyboard. Assume that an operator may input various value data items at the external input device. Then, the values data items are supplied through the HMI 72 to the storage/arithmetic unit 74. Thus, the storage/arithmetic unit 74 stores the value data items, in addition to various speed patterns. In response to request supplied to it, the storage/arithmetic unit 74 supplies the value data items to, for example, to the control output unit 80.

Figure 3:
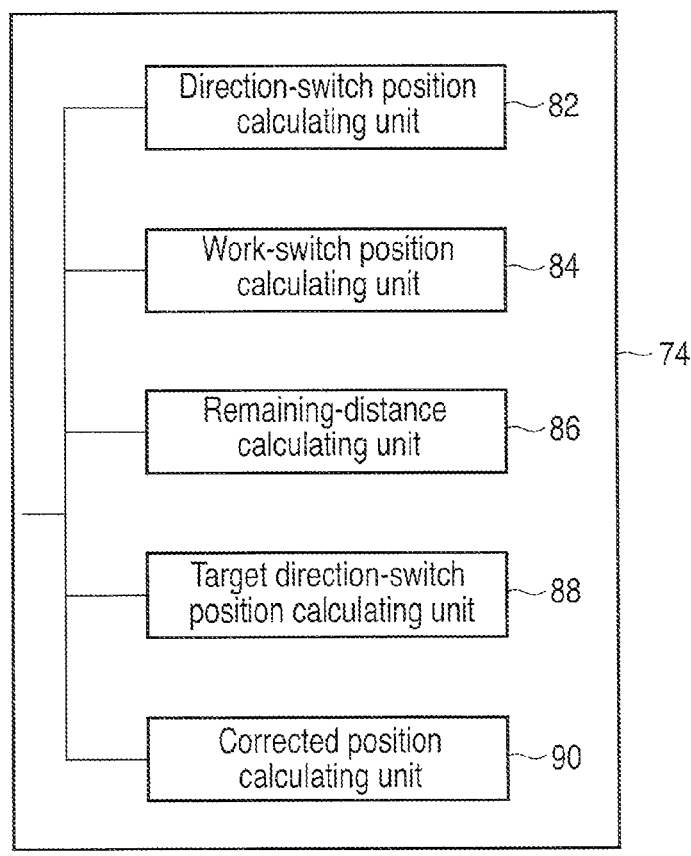
FIG. 3 is a block diagram showing the storage/arithmetic unit incorporated in the mold fastening device.

As shown in FIG. 3, the storage/arithmetic unit 74 comprises, in addition to some basic function units, a direction-switch position calculating unit 82, a work-switch position calculating unit 84, a remaining-distance calculating unit 86, a target direction-switch position calculating unit 88, and a corrected position calculating unit 90. The direction-switch position calculating unit 82 calculates, from various conditions, a direction-switch position at which the push-pin 44 should start moving in the opposite direction. The work-switch position calculating unit 84 calculates a work-switch position for the servomotor 56. The remaining-distance calculating unit 86 obtains the difference between a target direction-switch position and the direction-switch position calculated by the direction-switch position calculating unit 82, i.e., the distance the push-pin 44 should further move to reach the desirable direction-switch position. The target direction-switch position calculating unit 88 adds the remaining distance to the distance the push-pin 44 has moved starting at the work-switch position calculated by the work-switch position calculating unit 84, thereby calculating a target direction-switch position for the push-pin 44. The corrected position calculating unit 90 corrects the work-switch position of the servomotor 56, in accordance with the target direction-switch position calculated by the target direction-switch position calculating unit 88.

The "direction-switch position" is the position where the push-pin 44 moving forward or backward starts moving in the opposite direction. The push-pin 44 is moved back and forth repeatedly, each time changing its moving direction twice. That is, the push-pin 44 is reciprocated between two direction-switch positions.

The direction-switch position calculating unit 82 calculates the position where the push-pin 44 starts moving in the opposite direction in response to the value data the operator has input at the external input device. From the direction-switch position calculated by the direction-switch position calculating unit 82, the work-switch position calculating unit 84 calculates a work-switch position at which the push-pin 44 must start moving in the opposite direction. The work-switch position calculating unit 84 calculates such a work-switch position that the push-pin 44 may start moving in the opposite direction shortly before it reaches the direction-switch position by the operator.

If the servomotor 56 is driven when the push-pin 44 is at the work-switch position calculated by the work-switch position calculating unit 84, the remaining-distance calculating unit 86 calculates the remaining distance from the direction-switch position calculated by the direction-switch position calculating unit 82 and the direction-switch position input at the external input device. The target direction-switch position calculating unit 88 adds the remaining distance calculated by the remaining-distance calculating unit 86, to the distance the push-pin 44 has moved, starting at the work-switch position calculated by the work-switch position calculating unit 84, thereby calculating a target direction-switch position for the push-pin 44.

The corrected position calculating unit 90 calculates the position at which the servomotor 56 must be switched in order to make the push-pin 44 starts moving in the opposite direction at the target direction-switch position calculated by the target direction-switch position calculating unit 88.

Figure 2:
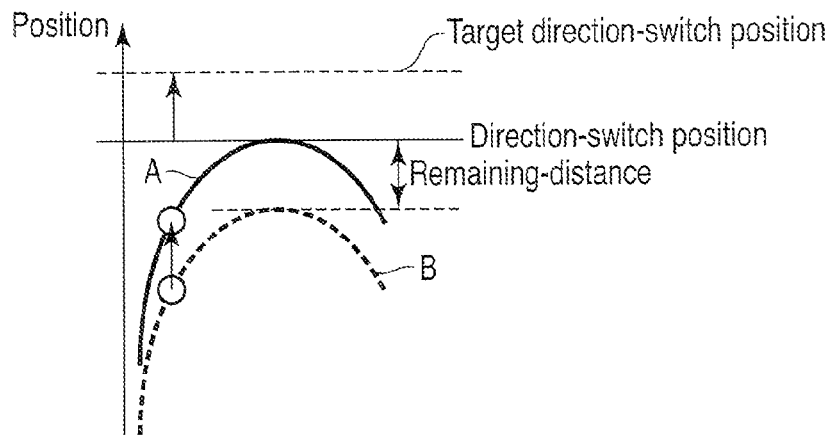
FIG. 2 is a graph representing the distance the push-pin is moved in the mold fastening device.

FIG. 2 shows the relationship of the direction-switch position and the remaining distance have with the position at which the push-pin 44 starts moving in the opposite direction if the servomotor 56 is driven when the push-pin 44 stays at the corrected target direction-switch position. In FIG. 2, curve A indicates the locus the push-pin 44 has if the servomotor 56 is switched in shaft rotation direction when the push-pin 44 stays at the target direction-switch position corrected by the corrected position calculating unit 90. Broken curve B indicates the locus push-pin 44 has if the servomotor 56 is driven when the push-pin 44 is at the work-switch position calculated by the work-switch position calculating unit 84.

A method of calculating the remaining distance will be explained. FIG. 4 shows a work signal C supplied to the servomotor 56 and speed D with which the distal end of the push-pin 44 is moved by the servomotor 56. The work signal C is based on the work-switch position calculated by the work-switch position calculating unit 84. The speed D is the speed with which the push-pin 44 is moved as the servomotor 56 is driven by the work signal C. The work signal C has a trapezoidal waveform. As seen for FIG. 4, the speed D changes, with a little delay with respect the work signal C because of the delay time of the servo system used.

Figure 5:
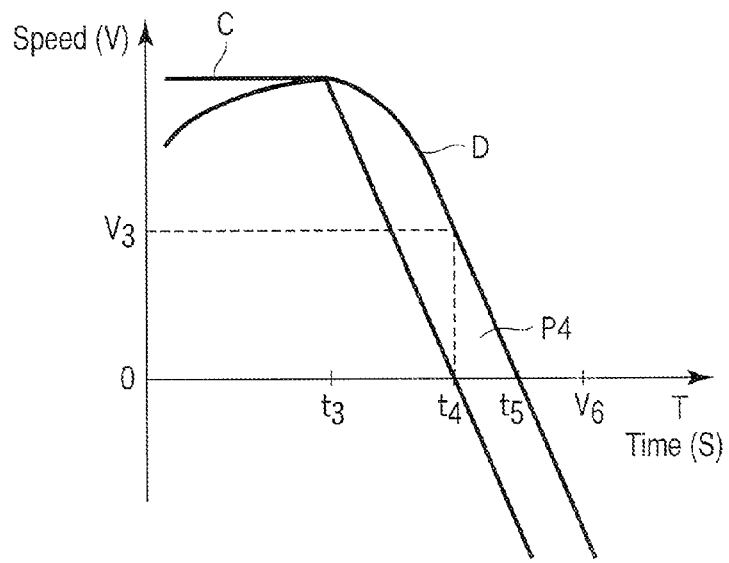
FIG. 5 is a diagram showing distance P4 the push-pin is moved in the mold fastening device.

FIG. 5 shows how the speed D changes from time t4 when the work signal C has zero in magnitude 0 to time t5 when the speed D is zero. At time t4, the speed D has value V3. In FIG. 5, P4 is the value obtained by integrating the speed D, form time t4 to time t5.

Figure 6:
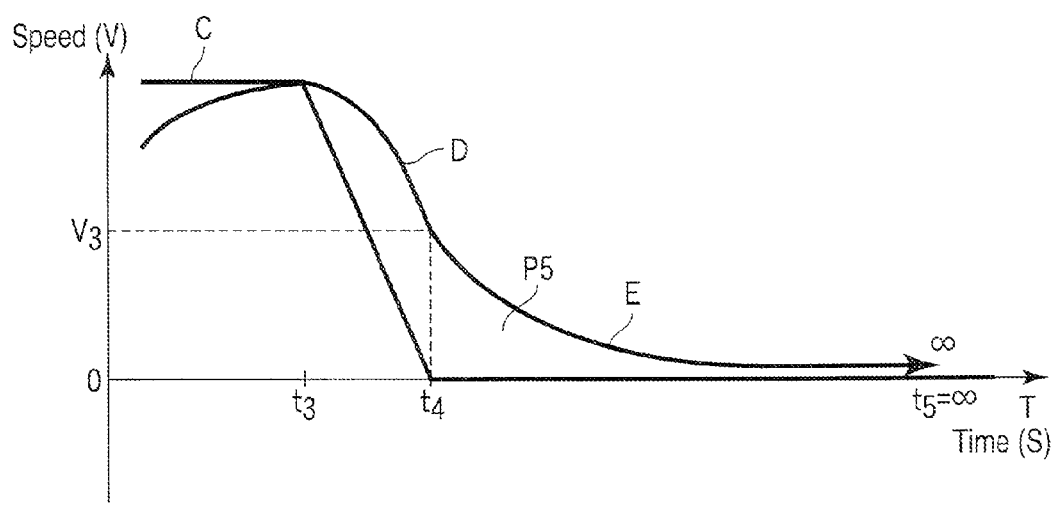
FIG. 6 is a diagram showing distance P5 the push-pin is moved in the mold fastening device.
Figure 7:
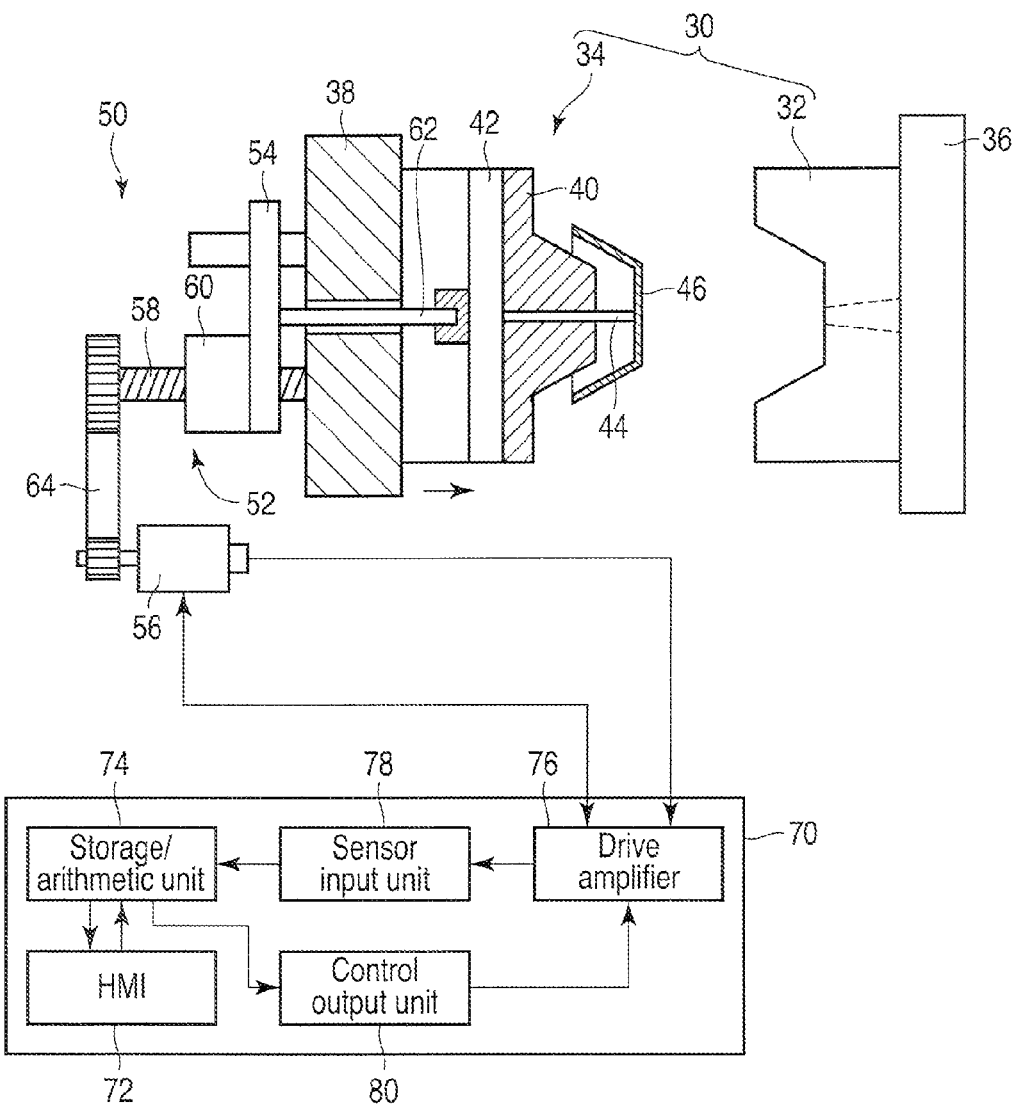
FIG. 7 is a sectional view showing another embodiment of a mold fastening device for use in an injection molding apparatus that has a reciprocating apparatus according to this invention.

FIG. 6 showing how speed E changes, converging from value V3 of speed D to 0 infinitely. In FIG. 6, P5 is a value obtained by integrating the speed E to 0 from time t4 to infinite. The remaining distance Pi is obtained by subtracting P4 from P5 (Pi=P5−P4).

How the control device 70 and the injection molding apparatus 10 operate will be explained.

First, the operator inputs, at the input device, speed data such as distal-end position and speed pattern. In the storage/arithmetic unit 74, the direction-switch position calculating unit 82 and the work-switch position calculating unit 84 calculates a direction-switch position and a work-switch position, respectively, from the speed data. From the direction-switch position and work-switch position, thus calculated, the remaining-distance calculating unit 86 calculates the remaining distance Pi. Then, the target direction-switch position calculating unit 88 calculates the target direction-switch position from the remaining distance Pi. From the target direction-switch position, the corrected position calculating unit 90 calculates a corrected position at which the push-pin 44 must start moving in the opposite direction. In accordance with the corrected position thus calculated, the servomotor 56 is driven.

The working of the servomotor 56 is therefore switched when the push-pin 44 is determined to reach the work-switch position. Hence, the push-pin 44 starts moving back at the position where it finishes moving forward for the remaining distance. Thus, the push-pin 44 starts moving in the opposite direction at the very position where it should do so.

While the push-pin 44 moving back, it is determined whether the push-pin 44 has reached the work-switch position. If the push-pin 44 is found to have reached the work-switch position, the rotation direction of the servomotor 56 is switched, whereby the push-pin 44 starts moving in the opposite direction.

Thus, the push-pin 44 is made to start moving in the opposite direction at the corrected position calculated by the corrected position calculating unit 90. Moved so precisely, the push-pin 44 pushes the product out of the mold 30, shortening the time for molding the product.

Moreover, since the working of the servomotor 56 is switched when the push-pin 44 reaches the work-switch position calculated, the position of the push-pin 44 need not be feedback to converge the speed as needed hitherto. This also serves to shorten the time for molding the product.

What is claimed is:

1. A reciprocating apparatus comprising:
    a reciprocating member configured to reciprocate freely;
    a drive mechanism configured to move the reciprocating member back and forth;
    an input device configured to input conditions in which to reciprocate the reciprocating member, the conditions including speed data for the reciprocating member and an input direction-switch position of the reciprocating member;
    a work-switch position calculating unit configured to calculate a work-switch position for the drive mechanism from the speed data input at the input device so that a direction-switch position of the reciprocating member may approach a value the input direction-switch position input at the input device;
    a calculated direction-switch position calculating unit configured to calculate a direction-switch position at which the reciprocating member must start moving in an opposite direction from a direction in which the reciprocating member was previously moving when the working of the drive mechanism is switched at the work-switch position calculated by the work-switch position calculating unit;
    a remaining-distance calculating unit configured to calculate a remaining distance that is a difference between the calculated direction-switch position calculated for the reciprocating member by the direction-switch position calculating unit and the input direction-switch position input at the input device;
    a target direction-switch position calculating unit configured to add the remaining distance calculated by the remaining-distance calculating unit to the direction-switch position calculated by the direction-switch position calculating unit, thereby calculating a target direction-switch position; and a corrected position calculating unit configured to calculate a corrected work-switch position for the drive mechanism so that the drive mechanism may cause the reciprocating member to start moving in the opposite direction at the target direction-switch position calculated by the target direction-switch position calculating unit.

2. The reciprocating apparatus according to claim 1, wherein the drive mechanism comprises a servomotor and a ball screw mechanism, and the ball screw mechanism converts the rotation of the servomotor to a linear motion, thereby driving the reciprocating member.

3. A method of controlling a reciprocating apparatus, comprising:

causing a work-switch position calculating unit to calculate a work-switch position for a drive mechanism from speed data for a reciprocating member input at an input device, so that a direction-switch position of the reciprocating member may approach an input direction-switch position input at the input device;

causing a direction-switch position calculating unit to calculate a calculated direction-switch position at which the reciprocating member must start moving in an opposite direction from a direction in which the reciprocating member was previously moving when the working of the drive mechanism is switched at the work-switch position preset by the work-switch position calculating unit;

causing a remaining-distance calculating unit to calculate, as a remaining distance, a difference between the calculated direction-switch position calculated by the direction-switch position calculating unit and the input direction-switch position input at the input device;

causing a target direction-switch position calculating unit to add the remaining distance calculated by the remaining-distance calculating unit to the direction-switch position calculated by the direction-switch position calculating unit, thereby calculating a target direction-switch position; and causing a corrected position calculating unit to calculate a corrected work-switch position so that the drive mechanism may cause the reciprocating member to start moving in the opposite direction at the target direction-switch position calculated by the target direction-switch position calculating unit.

4. The method according to claim 3, designed to control the reciprocating apparatus, wherein the drive mechanism comprises a servomotor and a ball screw mechanism, and the ball screw mechanism converts the rotation of the servomotor to a linear motion, thereby driving the reciprocating member.

5. An injection molding apparatus comprising:

an injection device configured to inject molding resin to a mold;

an opening/closing mechanism configured to open and close the mold;

a push-pin provided in the mold and configured to reciprocate freely;

a servomotor connected to the push-pin and configured to reciprocate the push-pin;

an input device configured to input conditions in which to reciprocate the push-pin, the conditions including speed data for the push-pin and an input direction-switch position of the push-pin;

a work-switch position calculating unit configured to calculate a work-switch position for the servomotor from the speed data input at the input device, so that a direction-switch position of the push-pin may approach the input direction-switch position input at the input device;

a direction-switch position calculating unit configured to calculate a calculated direction-switch position at which the push-pin must start moving in an opposite direction from a direction in which the push-pin was previously moving when the working of the servomotor is switched at the work-switch position calculated by the work-switch position calculating unit;

a remaining-distance calculating unit configured to calculate a remaining distance that is a difference between the calculated direction-switch position calculated for the push-pin by the direction-switch position calculating unit and the input direction-switch position input at the input device;

a target direction-switch position calculating unit configured to add the remaining distance calculated for the push-pin by the remaining-distance calculating unit to the direction-switch position calculated by the direction-switch position calculating unit, thereby calculating a target direction-switch position; and a corrected position calculating unit configured to calculate a corrected work-switch position for the servomotor so that the servomotor may cause the push-pin to start moving in the opposite direction at the target direction-switch position calculated by the target direction-switch position calculating unit.

6. The injection molding apparatus according to claim 5, wherein the servomotor comprises a ball screw mechanism, and the ball screw mechanism converts the rotation of the servomotor to a linear motion, thereby driving the push-pin.

* * * * *